Dec. 29, 1931.　　　T. B. VENSKE　　　1,838,721
DAIRY APPLIANCE
Filed May 7, 1930　　　2 Sheets-Sheet 1

Inventor
T. B. Venske

By Clarence A. O'Brien
Attorney

Dec. 29, 1931.  T. B. VENSKE  1,838,721
DAIRY APPLIANCE
Filed May 7, 1930  2 Sheets-Sheet 2
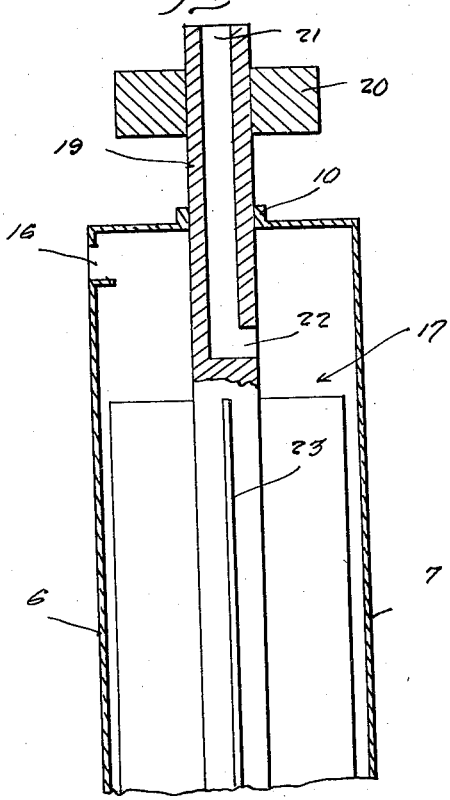
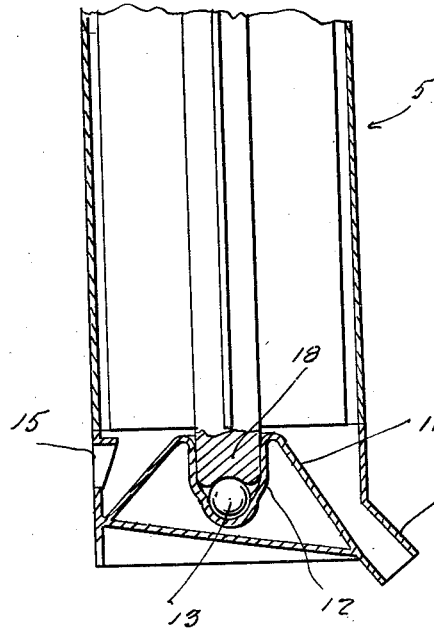
Fig. 2.
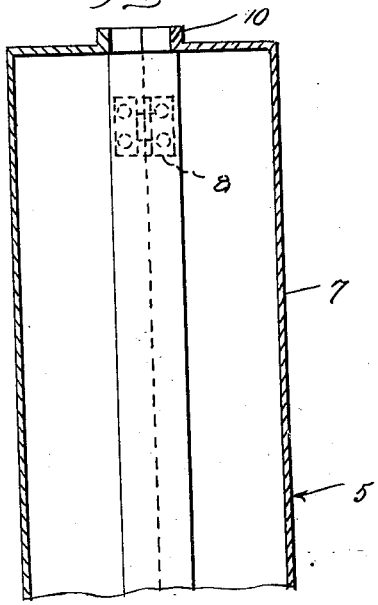
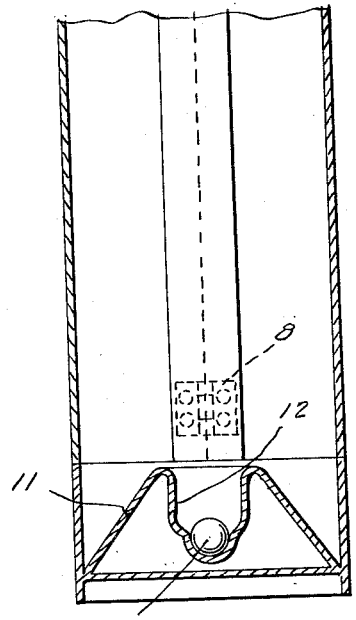
Fig. 4.
Inventor
T. B. Venske
By Clarence A. O'Brien
Attorney Patented Dec. 29, 1931

1,838,721

UNITED STATES PATENT OFFICE

THEODORE B. VENSKE, OF GARFIELD, MINNESOTA

DAIRY APPLIANCE

Application filed May 7, 1930. Serial No. 450,462.

This appliance relates to an improved appliance, especially, but not necessarily, adapted for use in a dairy for pre-heating, pasteurizing and cooling of milk or analogous liquid dairy products.

The purpose of the invention is to provide a simple, economical, dependable device characterized by an efficient structure which will either heat or cool the product evenly, thoroughly and quickly without the ordinary trouble incurred when heating coils are employed, thereby preventing the milk from caking, baking and curdling during the process of treatment and conditioning.

Briefly stated, the idea is carried into effect through the utilization of a sectional cylindrical container having appropriate means for introducing and discharging the milk, means for circulation of the treating medium (hot or cold), and a rotatable bladed agitator and distributor for producing the desired centrifugal liquid filming action to promote uniform conditioning.

In the drawings:

Figure 2 is a central vertical longitudinal section through the same.

Figure 3 is an enlarged cross sectional view.

Figure 4 is a view somewhat similar to Figure 2, the section being taken at right angles and the rotary bladed agitator being removed.

Figure 1:
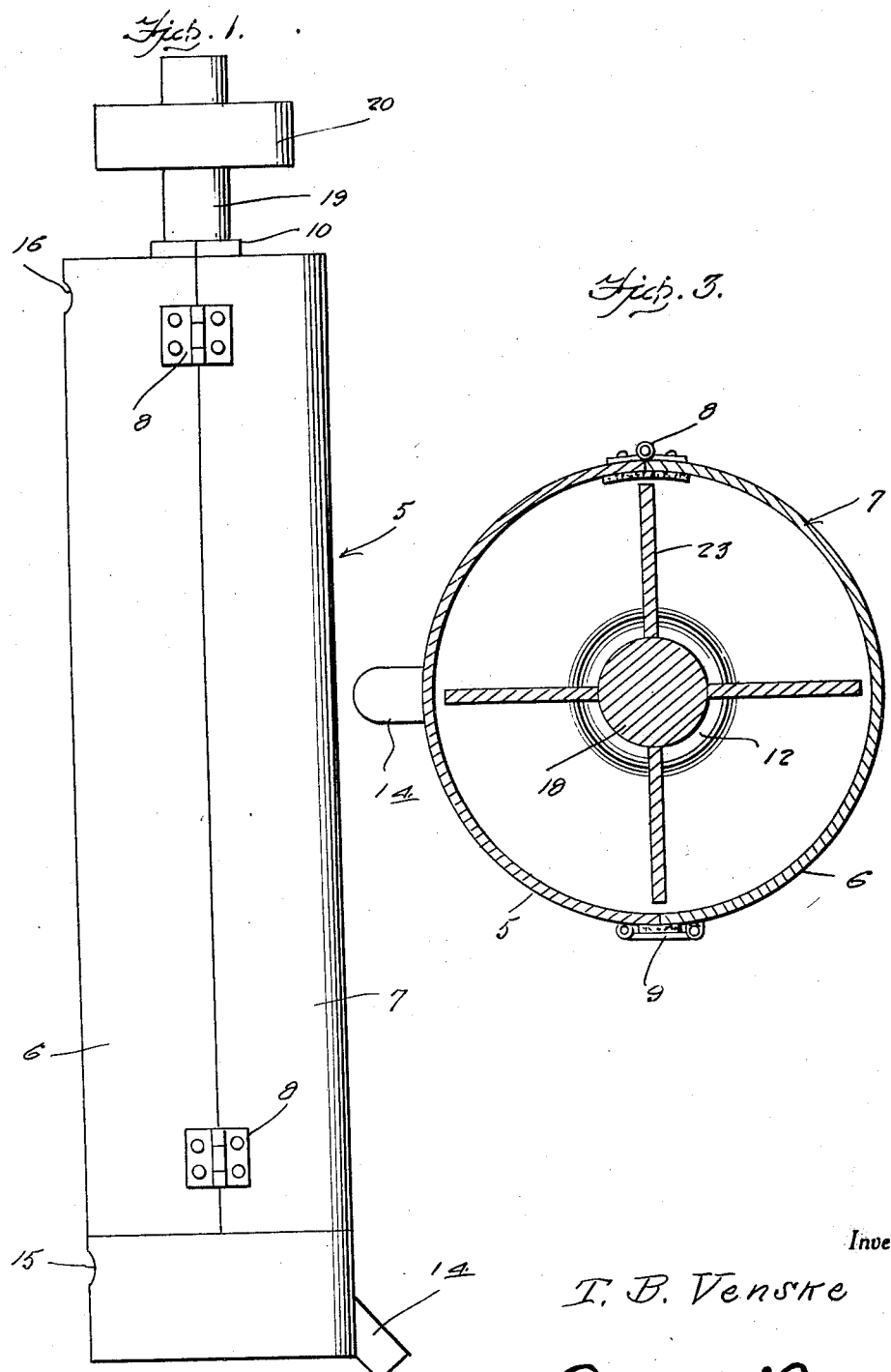
Figure 1 is an elevational view of an appliance constructed in accordance with the present invention.

In the drawings, the reference character 5 designates generally the main casing or container. This is made up of a pair of semi-circular half sections 6 and 7 hingedly connected together as at 8. Incidently the joint between the hinges is appropriately packed, to produce a fluid-tight connection.

Diametrically opposite to the hinges are appropriate fasteners 9 as seen in Figure 3, together with an associated packing strip for covering the abutting edge joint. At the top of the casing is a collar 10 defining a bearing. At the bottom and on the interior is a false raised bottom 11 of frusto-conical configuration. The apex portion thereof is formed with a depression 12 defining a socket and seated in the bottom of the socket is an anti-friction ball 13.

The surface of the conical false bottom co-operates with the product discharge nipple or outlet 14. The heating medium enters the container at the bottom through the opening 15. As before stated the "medium" may be either hot or cold air according to the treatment the milk is to receive.

The heated air circulates upwardly through the container and escapes through the discharge port 16 at the top. The numeral 17 designates generally the rotary agitator. This comprises a shaft 18 whose lower end portion is seated in the socket and rested on the ball to facilitate free rotation. The upper extended end portion 19 of the shaft extends through and beyond the bearing collar 10 where it is provided with a power application pulley 20.

It will be noted that this upper end portion of the shaft is formed with a bore defining an entrance as at 21 for the milk to be injected. The milk flows out through the laterally directed end portion 22 of the bore and into the container. Numeral 23 designates the radial blade which extends to a point in close spaced proximity to the inner surface of the casing.

In practice it is obvious that the product to be treated is introduced through the inlet 21 and enters the cylinder or casing at the point 22. The agitator or fan is set into rotation by suitable power and whirls the liquid product outwardly into a thin film which literally clings to the inner surface of the wall of the casing.

This centrifugal whirling and filming action spreads and distributes the liquid in such a manner as to allow the treating medium to better condition the milk as it gravitates downwardly. As before stated, if the milk is to be cooled, the cold air enters at the point 15 and circulates upwardly between the blades and acts on the downwardly flowing column of milk. The air escapes through the discharge port 16 at the top. The liquid however accumulates from the bottom and is discharged through the outlet 14 into an appropriate collection receptacle (not shown).

The effect of the rotating agitator filming the liquid against the inner wall of the casing insures more effective results and prevents accumulation on the wall of the container or on the blade of the agitator. Moreover, this arrangement makes for more rapid heating or cooling as the case may be.

The sectional construction of the casing facilitates cleansing of the casing as well as the agitator and other internal details.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. In a milk conditioning device of the class described, a vertically elongated cylindrical casing having a gravity milk outlet neck at its bottom, and a bearing collar at its top, said casing also having an inclined bottom and an integral frusto-conical inwardly projecting false bottom whose apex portion is depressed to provide a bearing socket in vertical alinement with said top bearing, the wall of said casing having an air inlet located at a point diametrically opposite to said milk discharge neck, and an air discharge port formed in the wall of the casing at a point above said inlet, a rotary agitator comprising a shaft having its lower end journalled for rotation in said socket and having its upper end portion mounted for rotation in said first named bearing, said shaft being provided with agitating and milk distributing blades, the upper end portion of the shaft being provided with an open longitudinal bore to permit introduction of the milk, and an opening at the lower end of the bore, communicating the bore with the interior of the casing, the opening being located near the upper ends of said blades.

2. In a milk conditioning device of the class described, a vertically elongated cylindrical casing having a gravity milk outlet neck at its bottom, and a bearing collar at its top, said casing also having an inclined bottom and an integral frusto-conical inwardly projecting false bottom whose apex portion is depressed to provide a bearing socket in vertical alinement with said top bearing, the wall of said casing having an air inlet located at a point diametrically opposite to said milk discharge neck, and an air discharge port formed in the wall of the casing at a point above said inlet, a rotary agitator comprising a shaft having its lower end journalled for rotation in said socket and having its upper end portion mounted for rotation in said first named bearing, said shaft being provided with agitating and milk distributing blades, the upper end portion of the shaft being provided with an open longitudinal bore to permit introduction of the milk, and an opening at the lower end of the bore communicating the bore with the interior of the casing, the opening being located near the upper ends of said blades, said casing being composed of a pair of semi-cylindrical bodies hinged together at one side and provided on the other side with releasable means to lock the bodies in abutting relation.

In testimony whereof I affix my signature.

THEODORE B. VENSKE.